United States Patent
Neau

(10) Patent No.: US 10,024,765 B2
(45) Date of Patent: Jul. 17, 2018

(54) SYSTEM AND METHOD FOR ANALYZING TIRE TREAD PARAMETERS

(71) Applicant: Xavier Neau, Greenville, SC (US)

(72) Inventor: Xavier Neau, Greenville, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 445 days.

(21) Appl. No.: 14/435,763

(22) PCT Filed: Oct. 31, 2012

(86) PCT No.: PCT/US2012/062720
§ 371 (c)(1),
(2) Date: Apr. 15, 2015

(87) PCT Pub. No.: WO2014/070156
PCT Pub. Date: May 8, 2014

(65) Prior Publication Data
US 2016/0033368 A1    Feb. 4, 2016

(51) Int. Cl.
*G01B 3/44* (2006.01)
*G01B 3/52* (2006.01)
(Continued)

(52) U.S. Cl.
CPC .......... *G01M 17/027* (2013.01); *B60C 11/24* (2013.01); *G01B 11/22* (2013.01); *G01B 11/24* (2013.01); *G01B 11/30* (2013.01); *G01M 17/02* (2013.01)

(58) Field of Classification Search
CPC ..... G01M 17/027; G01M 17/02; G01B 11/22; G01B 11/24; G01B 11/30; B60C 11/24
See application file for complete search history.

(56) References Cited

U.S. PATENT DOCUMENTS

| 3,964,303 A | 6/1976 | Vexelman et al. |
| 5,245,867 A | 9/1993 | Sube |

(Continued)

FOREIGN PATENT DOCUMENTS

| EP | 2110656 | 10/2009 |
| EP | 2311583 | 4/2011 |

OTHER PUBLICATIONS

PCT International Search Report for PCT/US2012/062720, dated Jan. 15, 2013.

*Primary Examiner* — Toan Le
(74) *Attorney, Agent, or Firm* — Dority & Manning, P.A.

(57) ABSTRACT

Systems and methods for analyzing tire tread data to assess tire tread parameters, such as irregular wear characteristics of a tire tread, are provided. More particularly, an automated and robust flattening process c be performed to transform tire tread data, such as a tread surface map, into flattened tire tread data. The flattened tire tread data can provide tread heights defined in a measurement direction that is normal to the surface of the tire tread, as opposed to parallel to a radial axis of the tire. The flattened tread data can be analyzed to assess one or more parameters of the tread of the tire. For instance, local height indicators for the flattened tread data can be determined using a local maximum as a reference. Because the local height indicators are relative heights determined from a local maximum, quantification of tread depth can be more easily obtained.

16 Claims, 12 Drawing Sheets

(51) Int. Cl.
  *G01M 17/02*  (2006.01)
  *G01B 11/24*  (2006.01)
  *G01B 11/30*  (2006.01)
  *B60C 11/24*  (2006.01)
  *G01B 11/22*  (2006.01)

(56) References Cited

U.S. PATENT DOCUMENTS

| | | |
|---|---|---|
| 5,249,460 A | 10/1993 | Dory et al. |
| 5,773,717 A * | 6/1998 | Reinhardt ............... G01N 3/24 73/146 |
| 6,535,281 B2 | 3/2003 | Conheady et al. |
| 6,539,789 B1 | 4/2003 | Kostka et al. |
| 6,802,130 B2 | 10/2004 | Podbielski et al. |
| 7,466,430 B2 | 12/2008 | Braghiroli |
| 2005/0057758 A1* | 3/2005 | Uehara ................ G01B 11/245 356/601 |
| 2005/0268707 A1 | 12/2005 | Dale |
| 2009/0033949 A1* | 2/2009 | Braghiroli ........... B60C 25/0554 356/635 |
| 2010/0000310 A1* | 1/2010 | Braghiroli ............. G01B 11/22 73/146 |
| 2010/0111370 A1 | 5/2010 | Block |
| 2010/0130099 A1 | 5/2010 | Manuel et al. |
| 2011/0019903 A1 | 1/2011 | Joly et al. |
| 2011/0126617 A1* | 6/2011 | Bengoechea Apezteguia ........... B60C 23/068 73/146 |
| 2011/0246128 A1* | 10/2011 | Nicholson ............... G01M 17/02 702/145 |
| 2013/0266225 A1 | 10/2013 | Vinciguerra et al. |

\* cited by examiner

SYSTEM AND METHOD FOR ANALYZING TIRE TREAD PARAMETERS

FIELD OF THE INVENTION

The present disclosure relates generally to analyzing tire tread parameters, and more particularly, to a system and method for analyzing tire tread data to assess tire tread parameters, such as irregular wear characteristics of the tire tread.

BACKGROUND OF THE INVENTION

Systems are known for obtaining tire tread surface data that provides a map of a tread surface of a tire. For instance, laser mapping systems have been used to obtain point by point data measurements of a surface of a tire. Such laser mapping systems typically include a laser probe used to measure the distance from the probe to the tire tread surface for each point along the surface of the tire. The output of these laser mapping systems provide a tread surface map for a tire. The tread surface map includes a set of data points providing a measure of tread height for a plurality of points about the surface of the tire. The tread surface map can be analyzed to assess parameters of the tire tread surface. For instance, a tread surface map can be analyzed to assess wear characteristics of the tire tread surface, such as irregular wear characteristics of the tire tread.

Known techniques for analyzing a tread surface map include modeling the tread surface using mathematical curves, such as polynomial functions. For example, U.S. Pat. No. 5,249,460 is directed to a method and apparatus for measuring irregular tread wear. In this example, data obtained from a laser scanner is analyzed and compared to a reference curve by a curve-fitting process. The deviation between the actual data and the reference curve can be used to establish the degree of irregular wear of the tire.

Using curve fitting techniques, such as polynomial curve fitting techniques, in analysis of tire tread surface data suffers several drawbacks. For example, the order of the polynomial or mathematical function must be adapted to the particular tire type, such as a truck tire versus a car tire. In many cases, the mathematical functions used to model the tire tread surface are difficult to fit with the tread surface data, leading to inaccuracies. Accuracy of the mathematical model can be increased by, for instance, increasing the degrees of freedom of the polynomial function. This, however, results in increased complexity and can lead to instability risks in fitting the mathematical function. In addition, the use of mathematical functions to model the tread surface data often do not account for discontinuities in the data or asymmetries between the left and right sides of the tire.

In typical techniques for analyzing tread surface data, such as tread surface maps, the reference for comparing the tread heights is the average tread height for the tire. This makes quantification of tread height cumbersome because the tread height values can be centered on each side of the reference with positive and negative values. In addition, the reference is not associated with the top surface of the tire as is with a manual tread gauge. Moreover, long wave deformation of the tire resulting from, for instance, false round or other uniformity parameter for the tire, can affect the reference for the tread height analysis.

Thus, a need exists for an improved system and method of analyzing tire tread surface data to assess parameters of a tread of a tire, such as irregular wear characteristics of a tread of tire. An automated system and method that more closely approximates physical observation of tread characteristics would be particularly useful.

SUMMARY OF THE INVENTION

Aspects and advantages of the invention will be set forth in part in the following description, or may be apparent from the description, or may be learned through practice of the invention.

One exemplary aspect of the present disclosure is directed to a method for analyzing tread surface data to assess one or more parameters of a tread of a tire. The method includes obtaining a tread surface map for a tire. The tread surface map includes a plurality of data points. Each data point provides a tread height for the tread of the tire defined in a measurement direction that is parallel to a radial axis of the tire. The method includes processing the tread surface map, with a computing device, using a flattening process to achieve a flattened tread surface map. The flattened tread surface map includes a plurality of flattened data points. Each flattened data point provides a flattened tread height for the tread of the tire defined in a measurement direction generally normal to a surface of the tread of the tire. The method further includes analyzing the flattened tread surface map to assess one or more parameters of the tread of the tire.

In a particular implementation, analyzing the flattened tread surface map to assess one or more parameters of the tread of the tire can include determining a local height indicator for one or more of the flattened data points based on a reference associated with a top surface of the tread. For instance, the local height indicator for each flattened data point can be obtained by determining a difference in height between the flattened tread height associated with the flattened data point and a local maximum flattened tread height defined in a sliding window of observation along a portion the flattened tread surface map.

Another exemplary aspect of the present disclosure is directed to a system for analyzing tread surface data to assess one or more parameters of a tread of a tire. The system can include a laser probe adapted to measure a tread surface map of a tread of a tire. The tread surface map includes a plurality of data points. Each data point provides a tread height for the tread of the tire defined in a measurement direction that is parallel to a radial axis of the tire. The system further includes a processor and a memory. The processor can be configured to execute computer-readable instructions stored in the memory to cause the processor to perform operations. The operations can include processing the tread surface map using a flattening process to achieve a flattened tread surface map. The flattened tread surface map can include a plurality of flattened data points. Each flattened data provides a flattened tread height for the tread of the tire defined in a measurement direction generally normal to a surface of the tread of the tire.

Yet another exemplary aspect of the present disclosure is directed to a computer-implemented method for analyzing tread surface data to assess one or more parameters of a tread of the tire. The method can include receiving, at a computing device, a tread surface map for a tire. The tread surface map can include a plurality of data points. Each data point can provide a tread height for the tread of the tire. The method can further include identifying a master curve from the tread surface map using an iterative linear fit process and generating a flattened tread surface map for the tread of the tire. The flattened tread surface map includes a plurality of flattened data points providing a flattened tread height for the tread of the tire. The flattened tread height for one or more flattened data points in the flattened tread surface map can be computed as the difference between the tread height for a corresponding data point in the tread surface map and a tread height defined by the master curve.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIGS. 7-14 plot the width of the tread along the abscissa and tread height along the ordinate.

FIG. 15 plots the width of the tread along the abscissa and tread height along the ordinate.

FIG. 16 plots the width of the tread along the abscissa and tread height along the ordinate.

DETAILED DESCRIPTION

Figure 1:
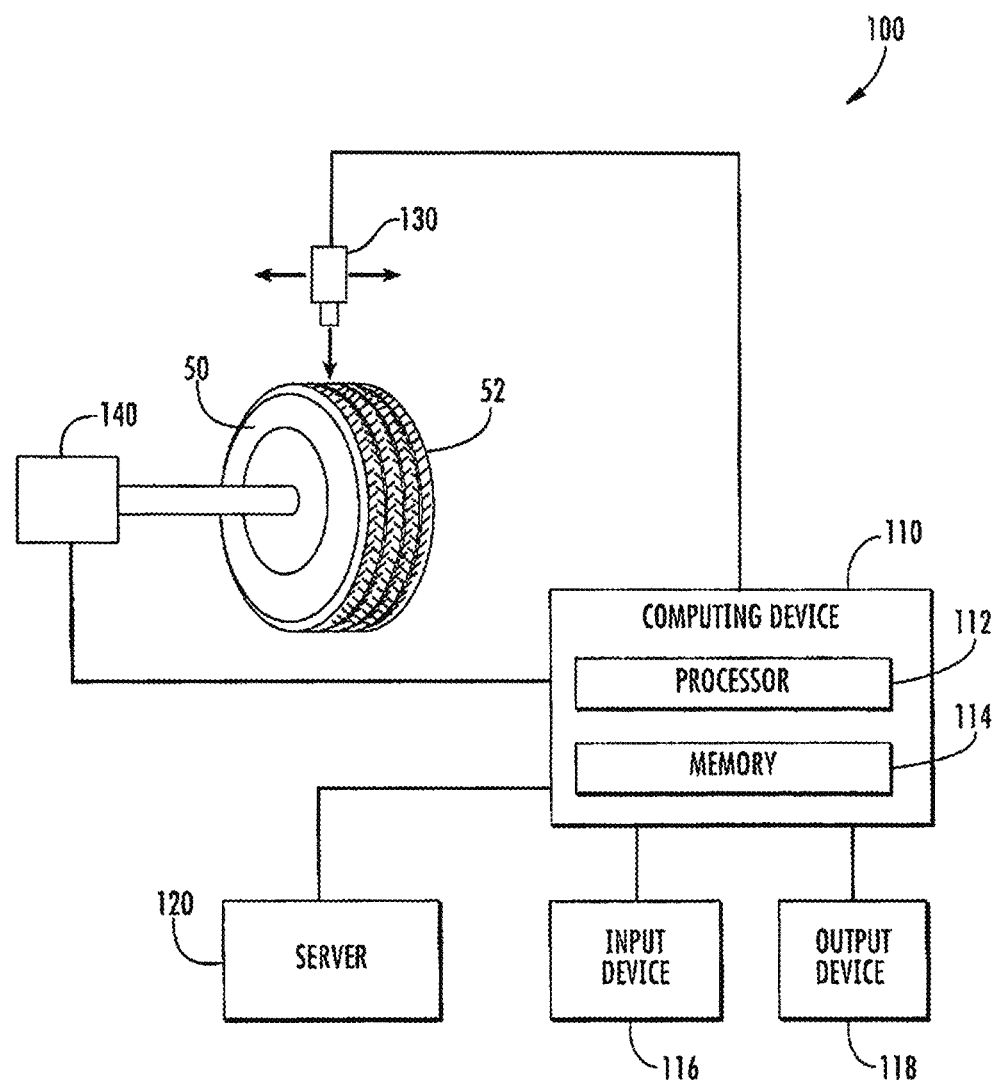
FIG. 1 depicts an exemplary system according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods for analyzing tire tread data to assess tire tread parameters, such as irregular wear characteristics of the tire tread. More particularly, an automated and robust flattening process can be performed to transform tire tread data, such as a tread surface map, into flattened tire tread data. The flattened tire tread data can provide tread heights defined in a measurement direction that is generally normal to the surface of the tire tread, as opposed to parallel to a radial axis of the tire. As used herein, "generally normal" to a surface refers to within 20 degrees of perpendicular to a surface, such as within 10 degrees of perpendicular to a surface.

In this manner, the flattened tread data can provide data that is more analogous to physical measurements that can be obtained, for instance, from a manual tread gauge. The flattened tread data can be analyzed to assess one or more parameters of the tread of the tire. For instance, local height indicators for the flattened tread data can be determined using a local maximum as a reference. Because the local height indicators are relative heights determined from a local maximum, quantification of tread depth can be more easily obtained, leading to more accurate assessment of tire parameters, such as irregular wear characteristics.

In one embodiment of the present disclosure, a tread surface map can be obtained for a tread of a tire. The tread surface map can be obtained using any suitable data capture device. For instance, the tread surface map can be obtained from a laser mapping device that uses a laser probe to map the tread surface of a tire. The tread surface map can have a plurality of data points providing a tread height defined in a measurement direction that is parallel to a radial axis of the tire, such as in a measurement direction defined by a laser probe, a sonic probe, an optical probe, a video probe, or other suitable probe.

After filtering, the tread surface map can be processed using a flattening process to transform the tread surface map into a flattened tread surface map. The flattened tread surface map can having a plurality of flattened data points. Each of the flattened data points can correspond to one of the data points of the tread surface map and can provide a flattened tread height. The flattened tread height provides a measurement of tread height defined in a direction normal to the surface of the tire.

The flattening process can include generating a robust and smart master curve for the tire tread from the tread surface map that is adaptable to any tire shape. For instance, the master curve can be generated from tires with irregular shapes, such as asymmetrical tires or tires with discontinuities or high local tread surface gradients. The flattening process can involve an iterative linear fit process that successively generates a plurality of linear fit tines from a profile of the tread surface. The linear fit lines can be generated for any tire shape, such as asymmetrical tire shapes or tire shapes with discontinuities. The master curve can be extracted from the linear fit lines. For instance, a minimum tread height defined by the plurality of fit lines for each lateral position along a width of the tire tread can be used to define the master curve. In this way, a master curve can be generated from the tread surface map that takes into account the local curvature of the tire without having to model the tread using a mathematical function, such as a polynomial function.

Once the master curve is generated, the flattened tread surface map can be generated by determining the difference between the tread heights defined by the master curve and the tread heights for the plurality of data points in the tread surface map. Because the master curve more accurately tracks the local curvature of the tire, the flattened tread heights provided by the flattened tread surface map can be defined in a measurement direction that becomes normal to the tire surface. In this manner, the tire tread data can be analyzed in a way more analogous to physical observation of tire tread parameters.

According to an exemplary aspect of the present disclosure, the flattened tread surface map generated in accordance with aspects of the present disclosure can be further processed to generate local height indicators for each flattened data point in the flattened tread surface map. These local height indicators can be used to generate a local height indicator map that can be used to quantify one or more parameters of the tire tread, such as to quantify tread depth for use in analysis of irregular wear of the tire tread.

Unlike techniques known in the prior art which use an average height for the tread as a reference, a local height indicator for a particular data point can be obtained from a reference defined by a local maximum in an area proximate the data point. In particular, the local height indicator for each flattened data point can be the minimum height difference between the flattened tread height associated with the flattened data point and one of a plurality of local maximums located in an area proximate the flattened data point. The local maximums can be defined while moving a sliding window of observation along a portion of the flattened tread surface map.

Using local maximums as a reference in determining the local height indicator for each flattened data point provides numerous advantages. For instance, because a local height indicator is determined using only data from an area proximate the location of the flattened data point, longer wavelengths resulting from tire deformations (e.g. false round or other uniformity concerns) do not impact the determination of the local height indicator. The local maximum reference is also close to the reference obtained with a manual tread gauge. As a result, a local height indicator map generated according to aspects of the present disclosure gives analogous results to tread gauge measurements while looking at tread depth. Moreover, because the local height indicators are relative heights determined from local maximums, absolute quantification of the tread height can be more easily obtained. This can lead to improved quantification of tire parameters, such as volume of irregular wear in the tread surface, shape of irregular wear, length of irregular wear, width of irregular wear, depth of irregular wear, location of irregular wear, or other suitable parameters.

Referring now to the FIGS., exemplary embodiments of the present disclosure will now be discussed in detail. FIG. 1 depicts an exemplary system 100 for analyzing characteristics of a tire 50 according to an exemplary embodiment of the present disclosure. The system 100 includes a laser probe 130 for measuring data associated with the tread 52 (e.g. tread heights) of the tire 50. The laser probe 130 can be any suitable device that can acquire tread height data using a laser, such as a laser probe used in the TMM-570 tire measurement machine manufactured by Wolf & Beck. The data acquired by the laser probe 130 can be provided to the computing device 110, which processes the data to assess one or more parameters of the tread 52, such as irregular wear characteristics. While the present disclosure will be discussed with reference to a laser mapping system that uses a laser probe 130 to acquire tread data for the tread 52, those of ordinary skill in the art, using the disclosures provided herein, will understand that the techniques according to exemplary embodiments of the present disclosure can be used for tread data obtained from any suitable source or mapping system, such as a sonic probe, optical probe, video probe (using stereo correlation imaging techniques), or other probe or device.

The laser probe 130 can collect data associated with tread height (e.g. distance from the laser probe to the tread surface) using a laser mapping process by impinging the surface of the tread 52 with a laser beam as the tire 50 is rotated using a rotator device 140, such as a stepper motor. The laser probe 130 can be positioned at a first lateral position relative to the width of the tread 52 as the tire 50 is rotated to acquire tread height data about the circumference of the tread 52 at the first lateral position. After the tire 50 has completed one rotation, the laser probe 130 can be shifted to a second lateral position relative to the width of the tread 52 to acquire tread heights for a plurality of data points about the circumference of the tread 52 at the second lateral position. This process can be repeated until the laser probe 130 has acquired sufficient data to map tread heights representative of the entire tread 52 of the tire 50. For instance, in one example, the laser probe 130 can acquire data at a resolution of about 1 mm×1 mm. The data acquired by the laser probe can be accurate to within about 0.1 mm of tread height.

The computing device 110 can control the laser probe 130 and the rotator device 140 to implement the laser mapping process. The computing device 110 can be any suitable computing device, such as a desktop, laptop, general purpose computing device, special purpose computing device, mobile device, tablet, or other suitable machine capable of automated computations. The computing device 110 can include one or more processor(s) 112 and at least one memory 114. The one or more processor(s) 112 can be any suitable processing device, such as a microprocessor, microcontroller, or other suitable processing device. The memory 114 can be any suitable computer-readable medium or media including non-transitory computer-readable media, such as but not limited to any combination of volatile memory (e.g., random access memory (RAM, such as DRAM, SRAM, etc.) and nonvolatile memory (e.g., ROM, flash, hard drives, magnetic tapes, CD-ROM, DVD-ROM, etc.) or any other memory devices including diskettes, drives, other magnetic-based storage media, optical storage media and others.

The memory 114 can store information accessible by processor(s) 112, including instructions that can be executed by processor(s) 112. The instructions can be any set of instructions that when executed by the processor(s) 112, cause the processor(s) 112 to provide desired functionality. The instructions can be implemented in hardware, application specific circuits, firmware and/or software. When software is used, any suitable programming, scripting, or other type of language or combinations of languages may be used to implement the functionality disclosed herein.

The computing device 110 can be adapted to function as a special-purpose machine providing desired functionality by executing the instructions with the processor(s) 112. For example, the processor(s) 112 can execute instructions stored in the memory 114 to cause the processor to obtain data collected by the laser probe 130 through one or more communication links. Processor(s) 112 can then process the data in accordance with the exemplary methods disclosed herein to provide useful output to a user. The processor(s) 112 can receive data input from a user through a suitable input device 116, such as through one or more of data entry keys, a touchscreen, a touchpad, a mouse, microphone for voice recognition, or other suitable input device. The processor(s) 112 can provide data to user through a suitable output device 118, such as a display or other suitable device. The analysis techniques disclosed herein can also be implemented by one or more servers 120 or across multiple computing and processing devices.

Figure 2:
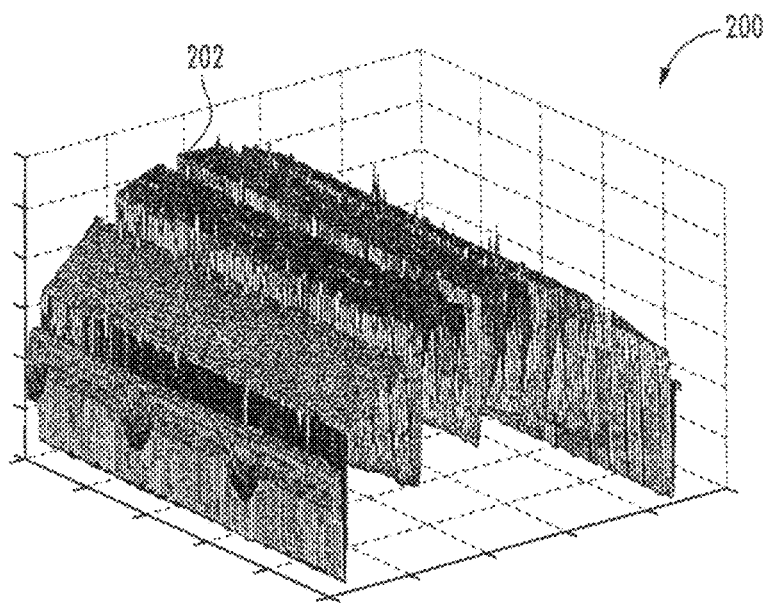
FIG. 2 depicts a tread surface map to be processed according to an exemplary embodiment of the present disclosure.

The data acquired by the laser probe 130 during the laser mapping process can be represented as a tread surface map. FIG. 2 depicts a graphical three-dimensional representation of an exemplary raw tread surface map 200 obtained for a tread according to an exemplary embodiment of the present disclosure. FIG. 2 plots the tread surface map 200 with the longitudinal circumferential direction of the tread along the abscissa, the lateral width of the tread along the ordinate, and the tread height along the applicate. The tread surface map 200 includes a plurality of data points 202. Each data point 202 is associated with a discrete location on the tread of a tire. Each data point 202 provides a tread height for the discrete location.

The tread heights provided for each data point 202 in the tread surface map 200 are defined in a measurement direction that is parallel to a radial axis of a tire. This can be more readily understood with reference to FIG. 3. As shown, the tread height measurements performed by the laser probe 130 are performed parallel to the radial axis R of tire. The tread height measurement approaches a measurement normal (i.e. perpendicular) to the surface of the tread 52 when the laser probe is at a lateral position relative to the width W of the tread 52 that is closer to the center of the tread 52, such as at lateral position A. However, when the laser probe 130 is at a lateral position that is closer to the edge of the tread 52, such as at lateral position B, the tread height measurements no longer approach normal to the surface of the tread 52.

Figure 3:
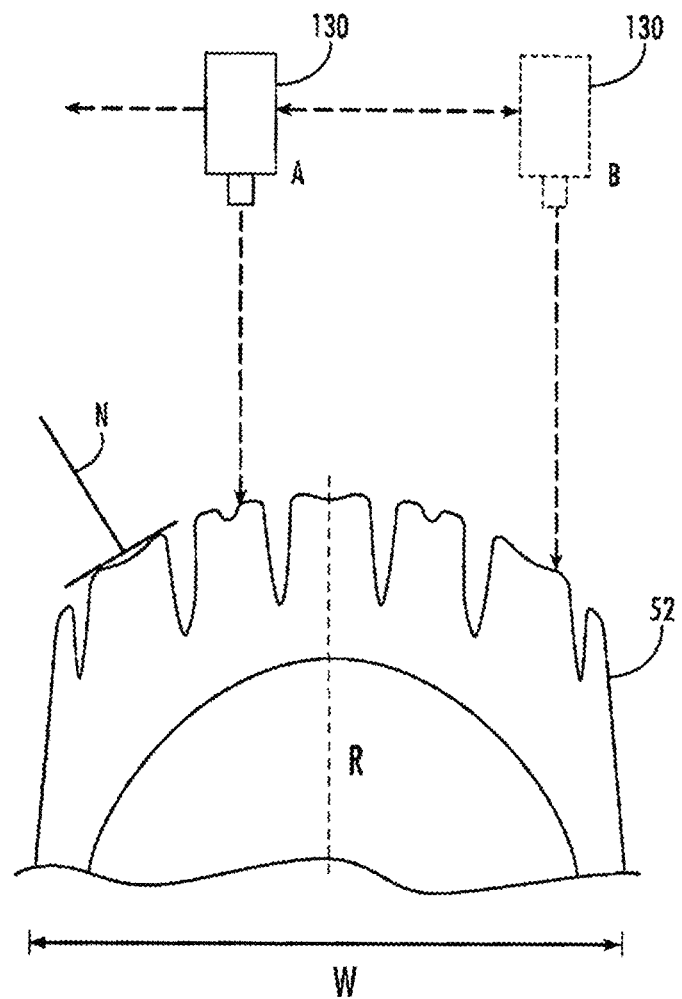
FIG. 3 depicts a representation of different measurement directions for measuring tread height according to an exemplary embodiment of the present disclosure.

Tread height measurements defined in a direction that are normal to the surface of the tread 52, such as in the direction N depicted in FIG. 3, more closely approximate tread measurements using a manual tread gauge. According to aspects of the present disclosure, the raw tread surface map 200 can be processed, for instance using computing device 110 of FIG. 1, to flatten the tread surface map such that the tread heights are defined in a direction that are more normal to the surface of the tread.

Figure 4:
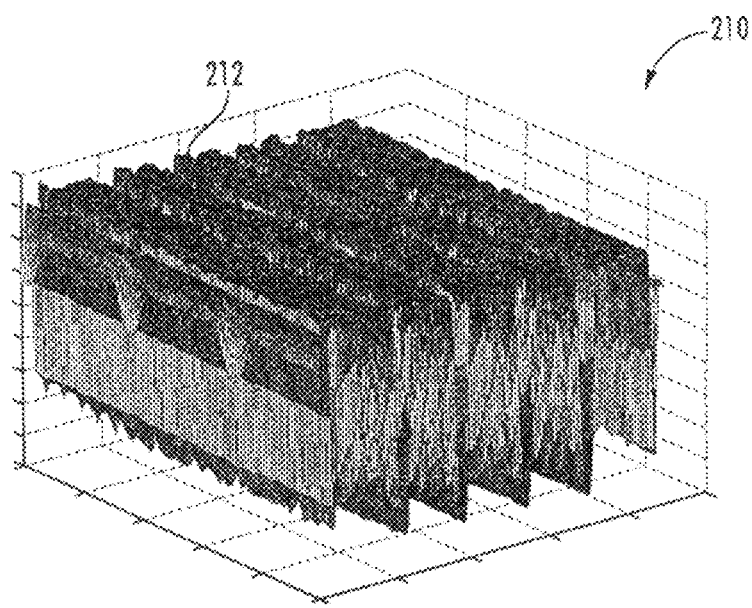
FIG. 4 depicts a flattened tread surface map obtained using a flattening process according to an exemplary embodiment of the present disclosure.

FIG. 4 depicts an exemplary flattened tread surface map 210 obtained according to exemplary embodiments of the present disclosure. FIG. 4 plots the flattened tread surface map 210 with the longitudinal circumferential direction of the tread along the abscissa, the lateral width of the tread along the ordinate, and the flattened tread height along the applicate. As illustrated, the flattened tread surface map 210 includes a plurality of flattened data points 212. Each of the flattened data points 212 provides a flattened tread height determined by processing the tread surface map 200 of FIG. 2 using a flattening process according to aspects of the present disclosure. The flattened tread map 210 can be analyzed to assess one or more parameters of the tread of the tire, such as irregular wear characteristics of the tread.

Figure 5:
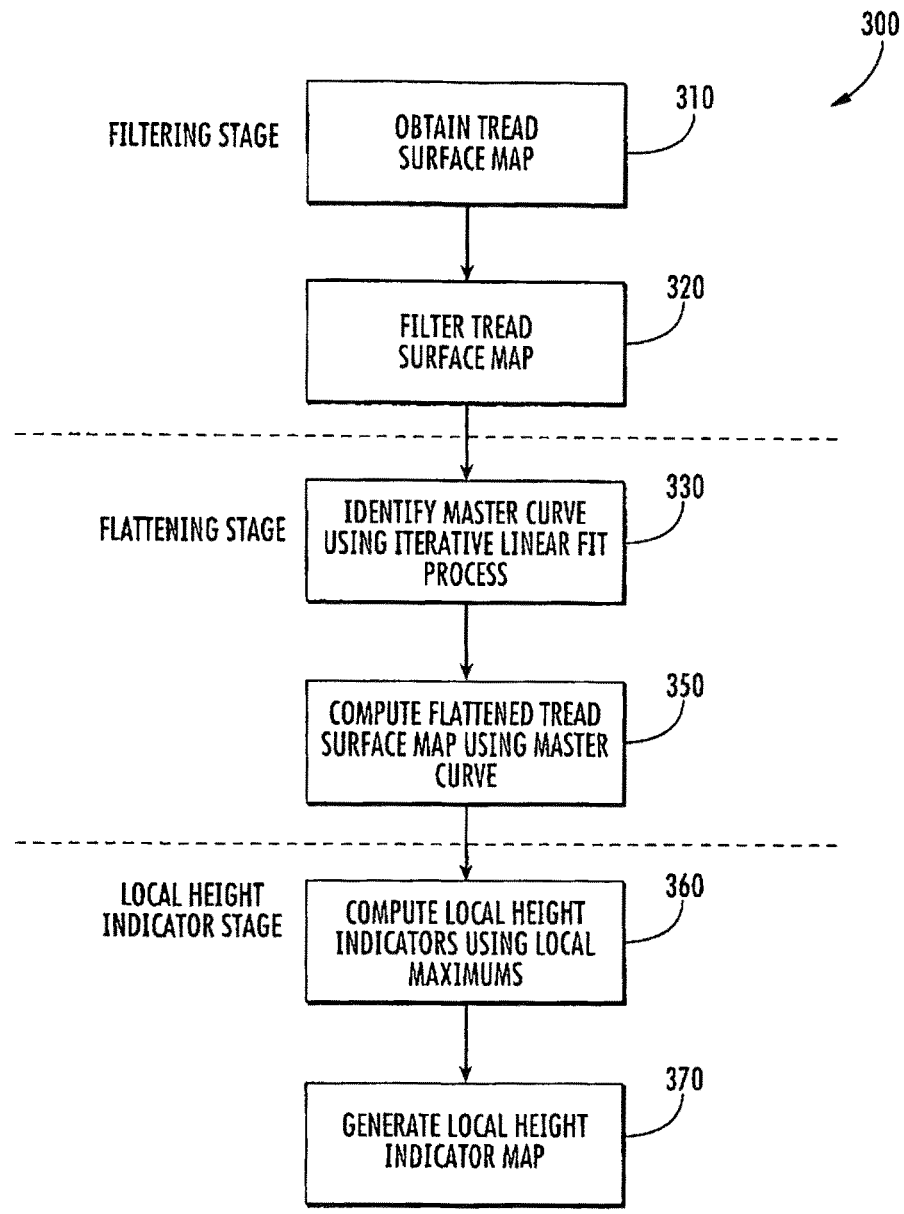
FIG. 5 depicts a flow diagram of an exemplary method according to an exemplary embodiment of the present disclosure.

FIG. 5 depicts a flow diagram of an exemplary automated method 300 that can be used to transform a raw tread surface map according to an exemplary embodiment of the present disclosure. The method 300 can be implemented using any suitable computing device, such as the computing device 110 of FIG. 1. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, the method 500 can include three stages, including a filtering stage, a flattening stage, and a local height indicator stage. The filtering stage obtains the initial raw tread surface data and filters the data so that the data is suitable for further processing. The flattening stage process the filtered raw data to obtained flattened tread data, such as the flattened tread surface map 210 depicted in FIG. 4. The local height indicator stage further processes the flattened tread data relative local maximums to generate data that can be used to quantify one or more parameters of the tire tread, such as volume of irregular wear.

The filtering stage includes at (310) obtaining a tread surface map for a tire, such as the tread surface map 200 of FIG. 2. The tread surface map can be obtained (e.g. received) from any suitable device or component across any suitable interface. In one example, the computing device 110 of FIG. 1 obtains the tread surface map from the laser probe 130. The tread surface map includes a plurality of data points providing a tread height for the tread of the tire defined in a measurement direction that is parallel to a radial axis of the tire. The tread surface map can be measured using any suitable process, such as a laser mapping process, sonic mapping process, optical mapping process, video mapping process (using stereo correlation imaging techniques), or other suitable process.

Referring back to FIG. 5 at (320), the filtering stage additionally includes filtering the tread surface map to condition the tread surface map for further processing. The filtering operation can be performed, for instance by the computing device 110 of FIG. 1. The filtering operation can remove outliers and decrease noise in the tread surface map. Any suitable filtering process can be used to condition the tread surface map without deviating from the scope of the present disclosure. As one example, outliers or data points associated with tread heights that are too far from the average heights can be identified. The peak tread heights associated with the identified data points can be replaced with average tread heights. In addition and/or in the alternative, a Perona-Malik filter can be used to decrease noise level in plateau areas of the tread surface map without smoothing the edges.

Referring to FIG. 5, the flattening stage includes at (330) identifying a master curve using an iterative linear fit process. For instance, the computing device 110 can implement an iterative linear fit process to generate a master curve from the tread surface map. The iterative linear fit process is configured to compute a master curve that takes into account the local curvature of the tread so that the tread height measurement is defined in a direction that becomes normal to the surface of the tread. The iterative linear fit process is also robust and is applicable to treads of many different shapes, such as treads with discontinuities/high gradients and/or asymmetries.

Figure 6:
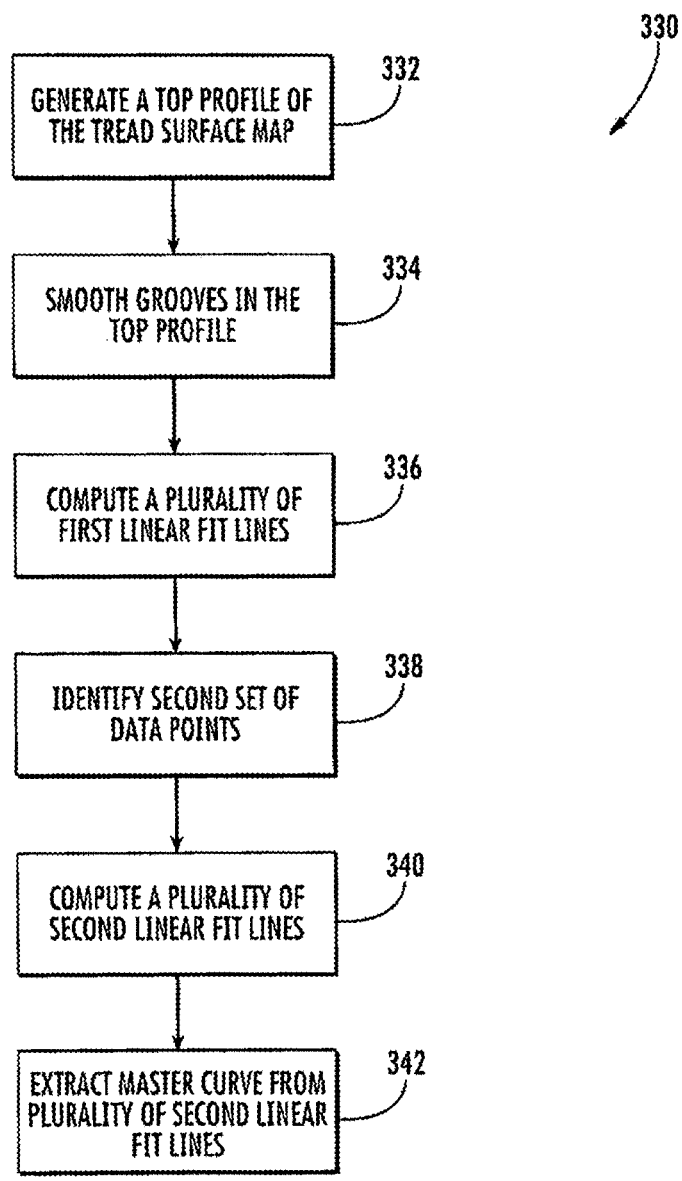
FIG. 6 depicts a flow diagram of generating a master curve using an exemplary linear fit process according to an exemplary embodiment of the present disclosure.

FIG. 6 depicts a flow diagram of an exemplary process (330) for identifying a master curve using an iterative fit process according to an exemplary embodiment of the present disclosure. At (332), the process (330) includes generating a top profile of the tread surface map. The top profile includes a distribution of a first set of data points along the width of the tread that are associated with a threshold tread height. For instance, the top profile can provide a distribution of tread heights associated with a threshold tread height of about 80% across the width of the tread such that 80% of the tread heights for a particular lateral position are less than the tread heights associated with the data points along the top profile. While data points associated with a threshold tread height of about 80% are used in the above example for purposes of illustration and discussion, other suitable threshold tread heights can be used without deviating from the scope of the present disclosure, such as any threshold tread height in the range of about 50% to about 100%, such as about 50%, 60%, 70%, 90%, or other suitable threshold tread height.

Figure 7:
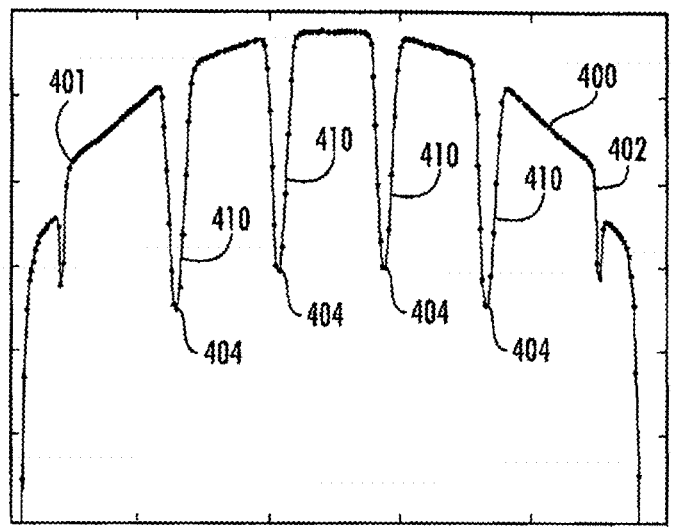
FIGS. 7-14 graphically depict an exemplary linear fit process according to an exemplary embodiment of the present disclosure.

FIG. 7 depicts a graphical representation of an exemplary top profile 400 for a tread surface map according to an exemplary embodiment of the present disclosure. As illustrated, the top profile 400 includes a distribution of a cfirst set of data points 402 along the width of the tread. The tread heights associated with first set of data points 402 are greater than about 80% of the tread heights at a particular lateral position along the width of the tread.

Figure 8:
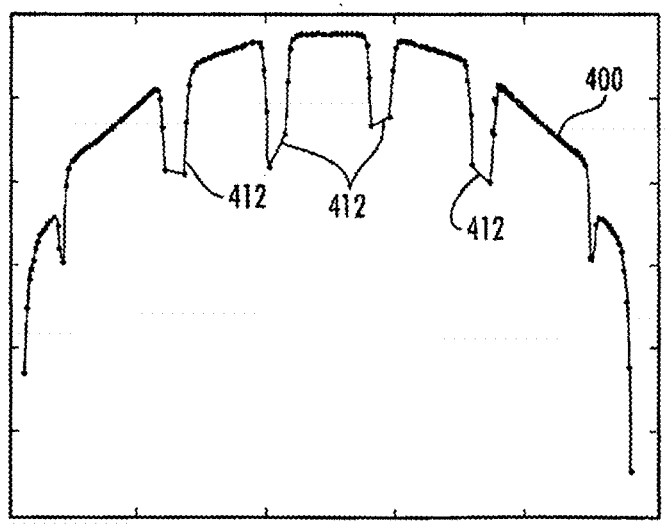

Referring back to FIG. 6 at (334), the iterative linear fit process optionally includes smoothing out one or more grooves in the top profile. For instance, as shown in FIG. 7, certain data points 404 are associated with the deep grooves 410 in the top profile 400 of FIG. 7. These data points 404 can be removed from the first set of data points in the top profile to smooth the deep grooves 410. For instance, as shown in FIG. 8, the data points 404 have been removed from the first set of data points to provide shallower grooves 412. Smoothing the grooves in the top profile can lead to increased accuracy in generating the master curve using the iterative linear fit process.

Figure 9:
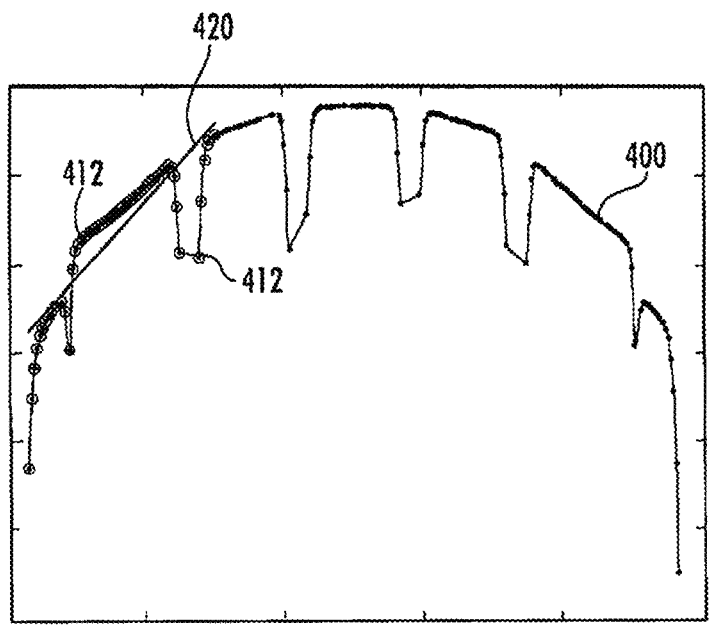
Figure 10:
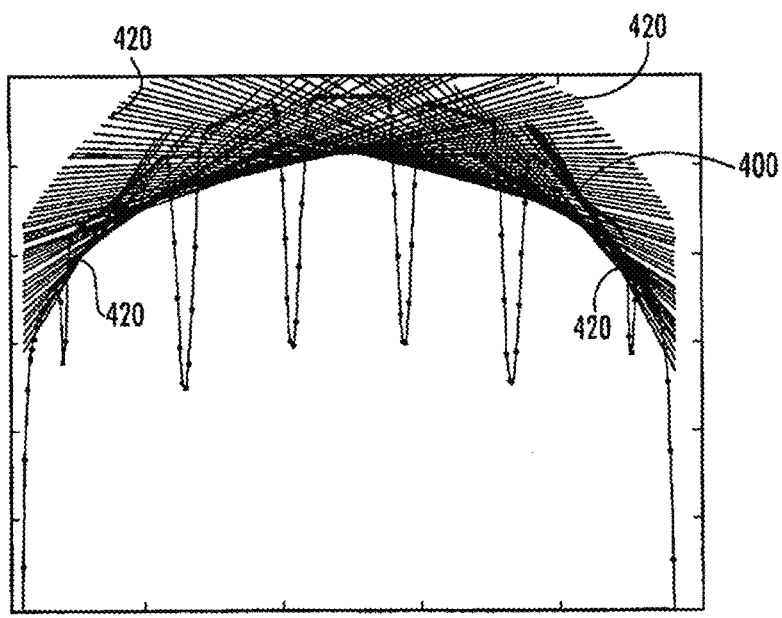

Referring to FIG. 6, the iterative linear fit process includes at (336) computing a plurality of first linear fit lines from selected data points in the first set of data points for the top profile. FIG. 9 provides a graphical representation of the computation of an exemplary first linear fit line 420 according to an exemplary embodiment of the present disclosure. As shown, selected data points 422 of the first set of data points of the top profile 400 are selected to compute the first linear fit line 420. The number of selected data points 422 selected to compute first linear fit line 420 can be chosen to provide a suitable approximation of the linear fit line 420. For instance, in one example, between 30 and 60 selected data points 422 can be used to compute the first linear fit line 420. Once the data points 422 have been selected, the first linear fit line 420 is computed to best fit the selected data points 422. The first linear fit line 420 can be computed from the selected data points 422 using any suitable linear fit technique, such as a linear regression technique or a linear programming technique. This process can be repeated multiple times from the first set of data points to obtain a plurality of first linear fit lines that span across the width of the top profile. FIG. 10 illustrates a plurality of first linear fit lines 420 computed from the first set of data points for the top profile 400.

Referring back to FIG. 6 at (338), the method includes identifying a second set of data points based at least in part on the plurality of first linear fit lines. For instance, data points associated with the top threshold percentage (e.g. the top 20% or other suitable percentage) of tread heights exceeding the tread heights defined by a first linear fit line can be identified for inclusion in the second set of data points.

Figure 11:
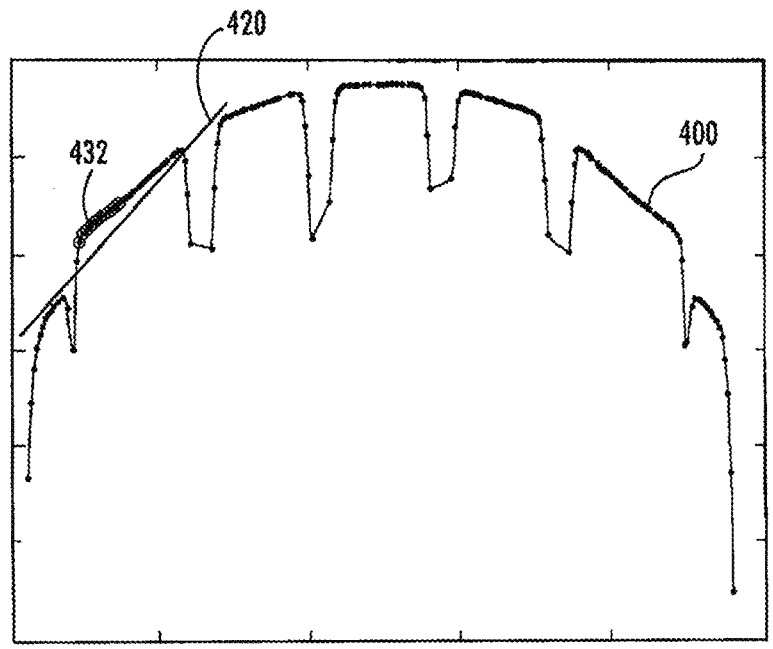

An example of identifying a second set of data points from the plurality of first linear fit lines is depicted in FIG. 11. As shown, the first linear fit line 420 defines a set of threshold tread heights as a function of width across the tread. Certain data points of the top profile are associated with a tread height that exceeds a tread height defined by the first linear fit line 420. Certain of these data points can be selected for inclusion in the second set of data. For instance, the data points 432 associated with the top 20% of tread heights can be selected for inclusion in the second set of data. While data points 432 associated with the top 20% are selected in FIG. 11 for purposes of illustration and discussion, other suitable thresholds can be used without deviating from the scope of the present disclosure.

Figure 12:
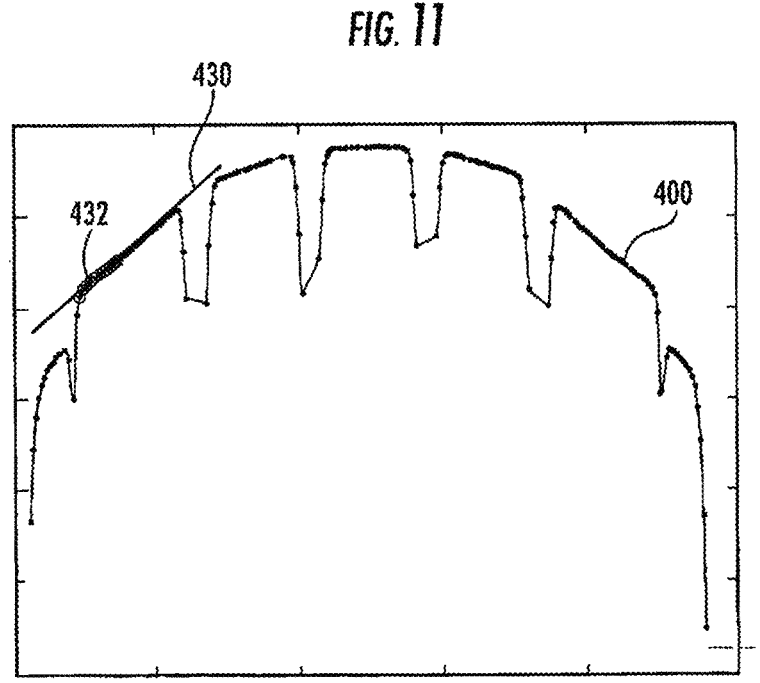

Once the second set of data points have been identified, a plurality of second linear fit lines can be generated as shown at (340) of FIG. 6. This is graphically depicted in FIG. 12 which shows a second linear fit line 430 fitted with a second set of data points 432. The second linear fit line 430 is computed to best fit the selected data points 432. The second linear fit line 430 can be computed from the selected data points 432 using any suitable linear fit technique, such as a linear regression technique or a linear programming technique.

Figure 13:
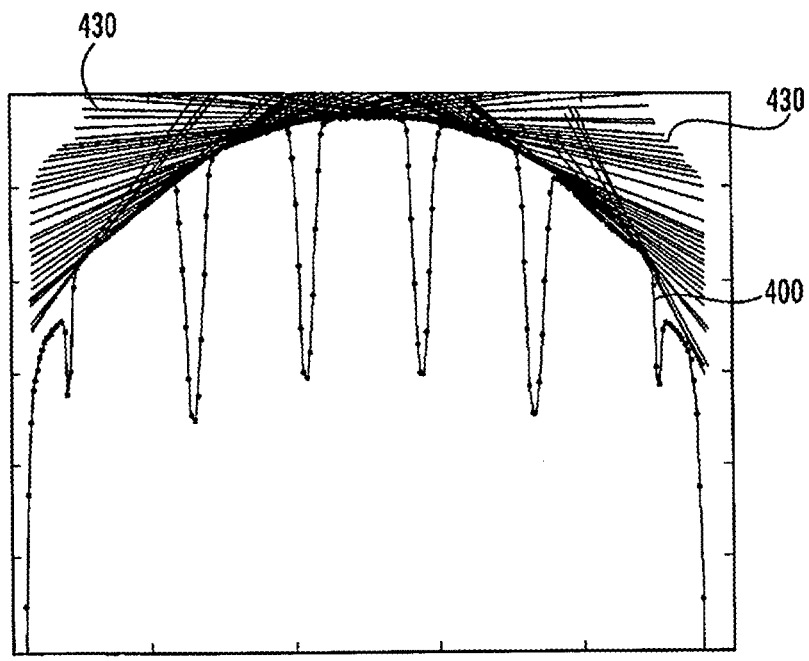

The processes of (338) and (340) of FIG. 6 can be repeated for each first linear fit line in the plurality of first linear fit lines identified at (336). The processes can be performed successively for each first linear fit line or can be performed in the aggregate. For instance, a second set of data points can be identified from each first linear fit line before computing second linear fit lines from the second set of data points. FIG. 13 illustrates a plurality of second linear fit lines 430 computed from the second set of data points for the top profile 400. As shown, the second linear fit lines 430 can be used to identify the local curvature of the tread across the width of the tread.

At (342) of FIG. 6, the iterative linear fit process includes extracting the master curve for the tread from the plurality of second linear fit lines. More particularly, as shown in FIG. 13, the plurality of second linear fit lines 430 each define a set of tread heights across the width of the tread. For each lateral position along the width of the tread, the plurality of second linear fit lines 430 define a minimum tread height. The master curve can be extracted from the plurality of second linear fit lines 430 by extracting the minimum tread height defined by the second linear fit lines for each lateral position along the width of the tread.

Figure 14:
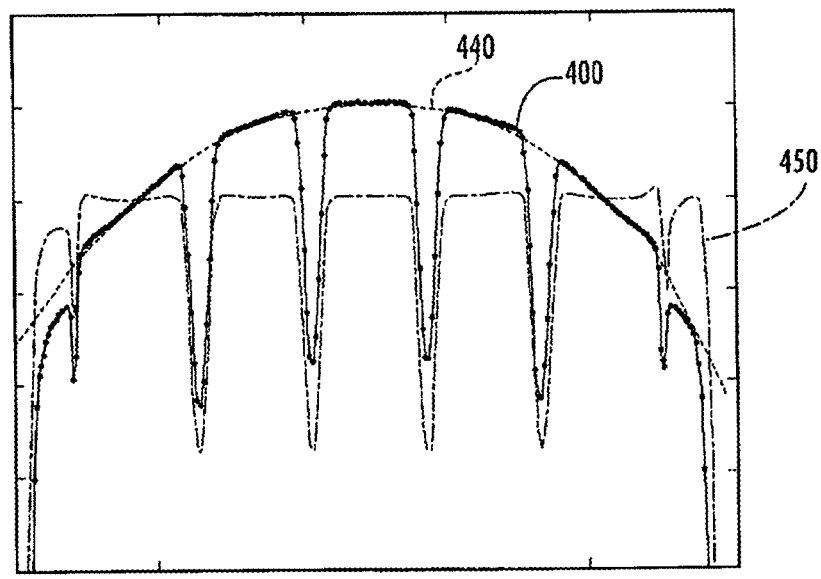
Figure 15:
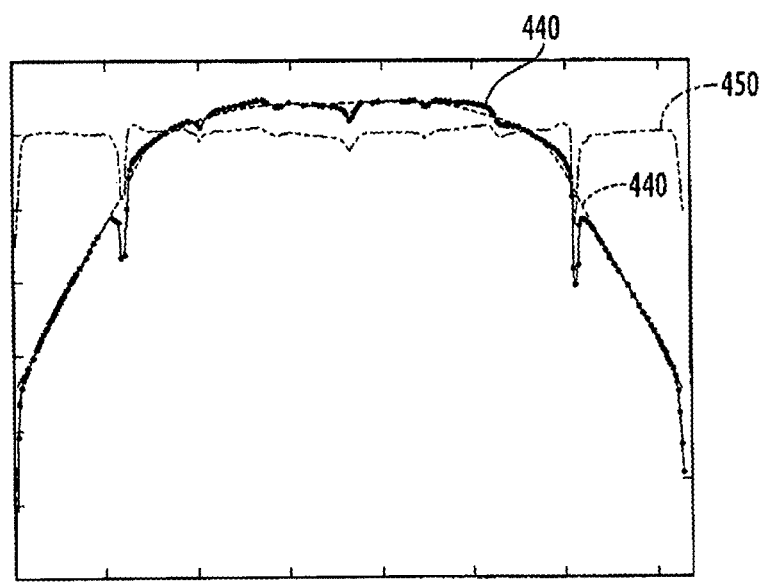
FIG. 15 depicts an exemplary master curve generated for a tread of a tire having discontinuities according to an exemplary embodiment of the present disclosure.
Figure 16:
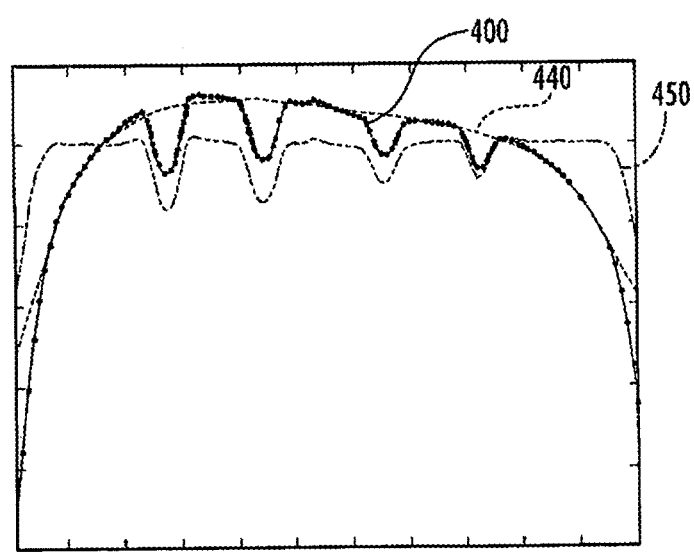
FIG. 16 depicts an exemplary master curve generated for a tread of an asymmetrical tire according to an exemplary embodiment of the present disclosure.

FIG. 14 depicts an exemplary master curve 440 extracted from the plurality of second linear fit lines 430 of FIG. 13, As shown in FIG. 14, the master curve 440 closely approximates the local curvature of the tire as provided by the top profile 400 of the tread. Using the exemplary iterative linear fit process described with reference to FIG. 6, a master curve can be obtained for a tread having any shape, including irregular shapes. For example, FIG. 15 illustrates a master curve 440 obtained for a tire having discontinuities. FIG. 16 illustrates a master curve 440 obtained for a tire having an asymmetrical tread shape.

Referring back to FIG. 5, the flattening stage further includes at (350) computing a flattened tread surface map using the master curve. In particular, the flattened tread height for each data point in the tread surface map can be computed as the difference between the tread height for the data point in the tread surface map and a tread height defined by the master curve. This is graphically depicted in FIG. 14, which depicts a flattened profile 450 obtained by determining the difference between tread heights defined by the top profile 400 and the tread heights defined by the master Curve 440. FIG. 15 illustrates a flattened profile 450 for a tire with discontinuities. FIG. 16 illustrates a flattened profile 450 for a tire having an asymmetrical tread shape. FIG. 4 provides an exemplary flattened data map 210 obtained as a result of the flattening stage of the method (300) of FIG. 5.

At (360) of FIG. 5, the local height indicator stage of the method (300) includes computing local height indicators for each flattened data point that can be used to quantify parameters of the tread, such as irregular wear characteristics. The local height indicators for each flattened data point are computed with reference to local maximums in the area proximate the flattened data point such that longer tire wavelengths resulting from tire deformations (e.g. false round or other uniformity concerns) do not impact the data provided by the local height indicator. In addition, the local height indicators are based on references similar to those used with a manual tread gauge.

Figure 17:
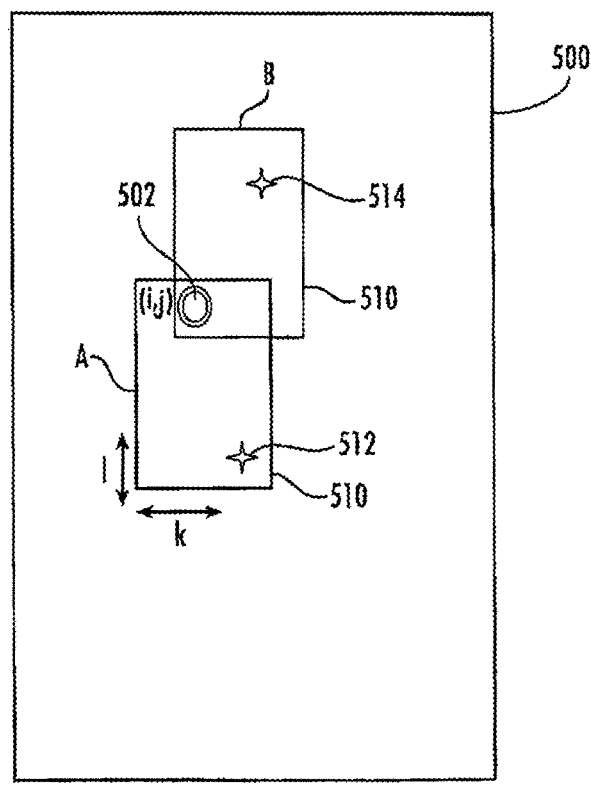
FIG. 17 graphically depicts use of a sliding window of observation to generate a local height indicator for a flattened data point according to an exemplary embodiment of the present disclosure.

FIG. 17 graphically depicts an exemplary process for determining a local height indicator for a flattened data point 502 in the flattened tread surface map 500 according to an exemplary embodiment of the present disclosure. In particular, the difference in height between the flattened tread height associated with the flattened data point and a plurality of local maximums are obtained. The plurality of local maximums are obtained by moving a sliding window of observation 510 in the area proximate the flattened data point 502. In one embodiment, the size of the sliding window of observation 510 is analogous to the size of a contact patch for the tire so that the sliding window of observation provides a frame of reference tied to use of the tire. However, the size of the sliding window does not have to be based on the size of the contact patch.

At each position of the sliding window of observation 510, a local maximum is identified. For instance, when the sliding window of observation 510 is at position A, a first local maximum 512 is identified in the sliding window of observation 510. When the sliding window is at position B, a second local maximum 513 is identified in the sliding window of observation 510. The local height indicator for the flattened data point 502 is the minimum distance in height to one of the identified local maximums. In particular, the local height indicator can be obtained pursuant to the following:

$$D(i, j) = \min_{k,l}(Z_{LocMax(k,l)} - Z_{P(i,j)})$$

where $D(i, j)$ is the local height indicator for a flattened data point $(i, j)$; $Z_{LocMax(k,l)}$ is the maximum flattened tread height associated with a sliding window of observation $k, l$; and $Z_{P(i,j)}$ is the tread height associated with the flattened data point $(i, j)$.

Once the local height indicators for each flattened data point have been obtained, a local height indicator map can be generated as shown at (370) if FIG. 5. The local height indicator map can provide a local height indicator for each data point on the surface of the tread of the tire. The local height indicator map can be provided in any suitable form.

Figure 18:
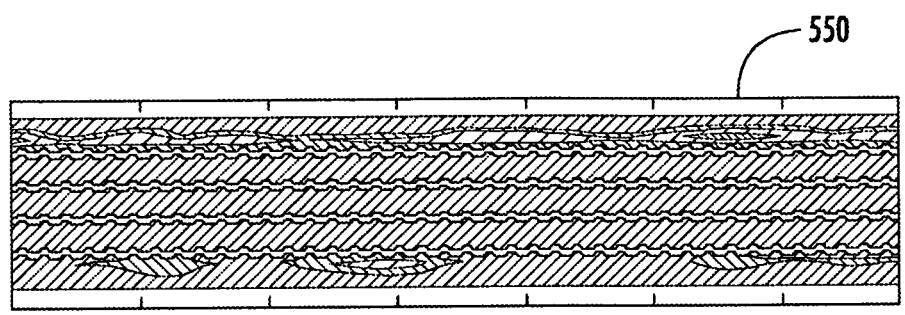
FIG. 18 depicts an exemplary local height indicator map generated according to an exemplary embodiment of the present disclosure.

An exemplary local height indicator map is depicted in FIG. 18. The local height indicator map 550 plots the longitudinal circumference of the tread along the abscissa and the width of the tire along the ordinate. The local height indicator map 550 can include a plurality of data points. Each data point can have a color/grayscale value associated with the local height indicator for the data point to provide a visual representation of tread parameters.

The local height indicator map 550 can be analyzed to quantify tread characteristics of the tire, such as irregular wear characteristics. Because the local height indicator map 550 provides tread height data based on a reference associated with a top surface of the tread, quantification of irregular wear of a tire can be more easily assessed. For example, the volume of irregular wear, shape of irregular wear, length of irregular wear, width of irregular wear, depth of irregular wear, location of irregular wear, or other suitable parameters can be more easily ascertained.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A method for analyzing tread surface data to assess one or more parameters of a tread of a tire, comprising:
    obtaining a tread surface map for a tire, the tread surface map comprising a plurality of data points, each data point providing a tread height for the tread of the tire defined in a measurement direction that is parallel to a radial axis of the tire;
    processing, with a computing device, the tread surface map using a flattening process to achieve a flattened tread surface map, the flattened tread surface map comprising a plurality of flattened data points, each flattened data point providing a flattened tread height for the tread of the tire defined in a measurement direction generally normal to a surface of the tread of the tire, wherein the flattening process is based on a master curve derived from the tread surface map that takes into account a local curvature of the tread of the tire; and
    analyzing the flattened tread surface map to assess one or more parameters of the tread of the tire,
    wherein the flattening process comprises:
        identifying the master curve from the tread surface map using an iterative linear fit process; and
        computing the flattened tread height for each flattened data point as a difference between the tread height for a corresponding data point in the tread surface map and a tread height defined by the master curve.

2. The method of claim 1, wherein the method comprises filtering the tread surface map.

3. The method of claim 1, wherein the iterative linear fit process comprises:
    generating a top profile of the tread surface map for a first set of data points in the tread surface map, the first set of data points being associated with a threshold tread height;
    computing a plurality of first linear fit lines from the first set of data points for the top profile;
    identifying a second set of data points based at least in part on the plurality of first linear fit lines;
    computing a plurality of second linear fit lines from the second set of data points; and
    extracting the master curve from the plurality of second linear fit lines by identifying a minimum tread height defined by the plurality of second linear fit lines for each lateral position along a width of the tread.

4. The method of claim 3, wherein the iterative linear fit process comprises smoothing one or more grooves in the top profile.

5. The method of claim 3, where identifying the second set of data points based at least in part on the plurality of first linear fit lines comprises identifying data points associated with a tread height exceeding a tread height defined by one of the plurality of first linear fit lines.

6. The method of claim 1, wherein analyzing the flattened tread surface map to assess one or more parameters of the tread comprises determining a local height indicator for one or more of the flattened data points for the flattened tread surface map.

7. The method of claim 6, wherein the local height indicator is determined for a flattened data point by determining a difference in tread height between a flattened tread height for the flattened data point and a local maximum flattened tread height defined in a sliding window of observation along a portion the flattened surface tread map.

8. The method of claim 7, wherein the size of the sliding window of observation is based on a size of a contact patch for the tire.

9. The method of claim 6, wherein the method further comprises generating a local height indicator map mapping the local height indicator for each of the one or more flattened data points.

10. The method of claim 9, wherein the method further comprises analyzing the local height indicator map to quantify irregular wear of the tread of the tire.

11. The method of claim 1, wherein the tread surface map is generated from a laser probe, sonic probe, optical probe, or video probe.

12. A system for analyzing tread surface data to assess one or more parameters of a tread of a tire, the system comprising:
a laser probe adapted to measure a tread surface map of a tread of a tire, the tread surface map comprising a plurality of data points, each data point providing a tread height for the tread of the tire defined in a measurement direction that is parallel to a radial axis of the tire;
a computing device having a processor and a memory, the processor configured to execute computer-readable instructions stored in the memory to cause the processor to perform operations, the operations comprising processing the tread surface map using a flattening process to achieve a flattened tread surface map, the flattened tread surface map comprising a plurality of flattened data points, each flattened data point providing a flattened tread height for the tread of the tire defined in a measurement direction generally normal to a surface of the tread of the tire;
wherein the flattening process is based on a master curve derived from the tread surface map that takes into account a local curvature of the tread of the tire; and
wherein the flattening process comprises:
identifying the master curve from the tread surface map using an iterative linear fit process; and
computing the flattened tread height for each flattened data point as the difference between the tread height for a corresponding data point in the tread surface map and a tread height defined by the master curve.

13. The system of claim 12, wherein the linear fit process comprises:
generating a top profile of the tread surface map for a first set of data points in the tread surface map, the first set of data points being associated with a threshold tread height;
computing a plurality of first linear fit lines from the first set of data points for the top profile;
identifying a second set of data points based at least in part on the plurality of first linear fit lines;
computing a plurality of second linear fit lines from the second set of data points; and
extracting the master curve from the plurality of second linear fit lines.

14. The system of claim 12, wherein the operations further comprise determining a local height indicator for one or more of the flattened data points for the flattened tread surface map, the local height indicator being determined based on a reference associated with a top surface of the tread.

15. A computer-implemented method for analyzing tread surface data to assess one or more parameters of a tread of a tire, comprising:
receiving, at a computing device, a tread surface map for a tire, the tread surface map accounting for a local curvature of a tread of the tire and comprising a plurality of data points, each data point providing a tread height for the tread of the tire;
identifying a master curve from the tread surface map using an iterative linear fit process; and
generating a flattened tread surface map for the tread of the tire, the flattened tread surface map comprising a plurality of flattened data points providing a flattened tread height for the tread of the tire,
wherein the flattened tread height for one or more flattened data points in the flattened tread surface map are computed as the difference between the tread height for a corresponding data point in the tread surface map and a tread height defined by the master curve; and
wherein the iterative linear fit process comprises:
generating a top profile of the tread surface map for a first set of data points in the tread surface map, the first set of data points being associated with a threshold tread height;
computing a plurality of first linear fit lines from the first set of data points for the top profile;
identifying a second set of data points based at least in part on the plurality of first linear fit lines;
computing a plurality of second linear fit lines from the second set of data points; and
extracting the master curve from the plurality of second linear fit lines.

16. The computer-implemented method of claim 15, wherein the method further comprises generating local height indicator map mapping a local height indicator for each of the one or more flattened data points, the local height indicator for each flattened data point obtained by determining a difference in height between the flattened tread height associated with the flattened data point and a local maximum flattened tread height defined in a sliding window of observation along a portion of the flattened tread surface map.

* * * * *